United States Patent [19]
Anderson

[11] 3,895,560
[45] July 22, 1975

[54] CYLINDER MOTION SENSING

[75] Inventor: Ernest David Anderson, Narragansett, R.I.

[73] Assignee: Leesona Corporation, Warwick, R.I.

[22] Filed: Nov. 12, 1973

[21] Appl. No.: 414,689

[52] U.S. Cl. .................................. 91/1; 91/421
[51] Int. Cl.[2] .................... F01B 25/26; F01B 31/12
[58] Field of Search ........................ 91/1, 421, 451

[56] References Cited
UNITED STATES PATENTS

| | | | |
|---|---|---|---|
| 2,028,766 | 1/1936 | Ernst et al. | 91/421 X |
| 2,501,483 | 3/1950 | Taylor | 91/421 X |
| 3,461,780 | 8/1969 | Schmon | 91/451 X |
| 3,584,538 | 6/1971 | Petersen | 91/421 |
| 3,608,431 | 9/1971 | Pease | 91/1 X |
| 3,691,902 | 9/1972 | Lebzelter | 91/1 |

Primary Examiner—Martin P. Schwadron
Assistant Examiner—Abraham Hershkovitz
Attorney, Agent, or Firm—Albert P. Davis; Burnett W. Norton

[57] ABSTRACT

Fluid back-pressure flowing out a cylinder when being powered through a stroke is sensed by fluid logic circuits to produce a signal which indicates that piston movement is slowed or stopped. A fluid logic device with a flexible impervious diaphragm senses the back pressure to provide an output signal when the piston is not functioning properly. The detector is made more sensitive and selective by restricting a flow path for the back-pressure and operating the logic device as a pressure amplifier, responsive to a threshold back-pressure valve. The sensor is operable to produce a negative going dynamic output transition as a signal that the piston rate is not exceeding a particular threshold value.

8 Claims, 3 Drawing Figures

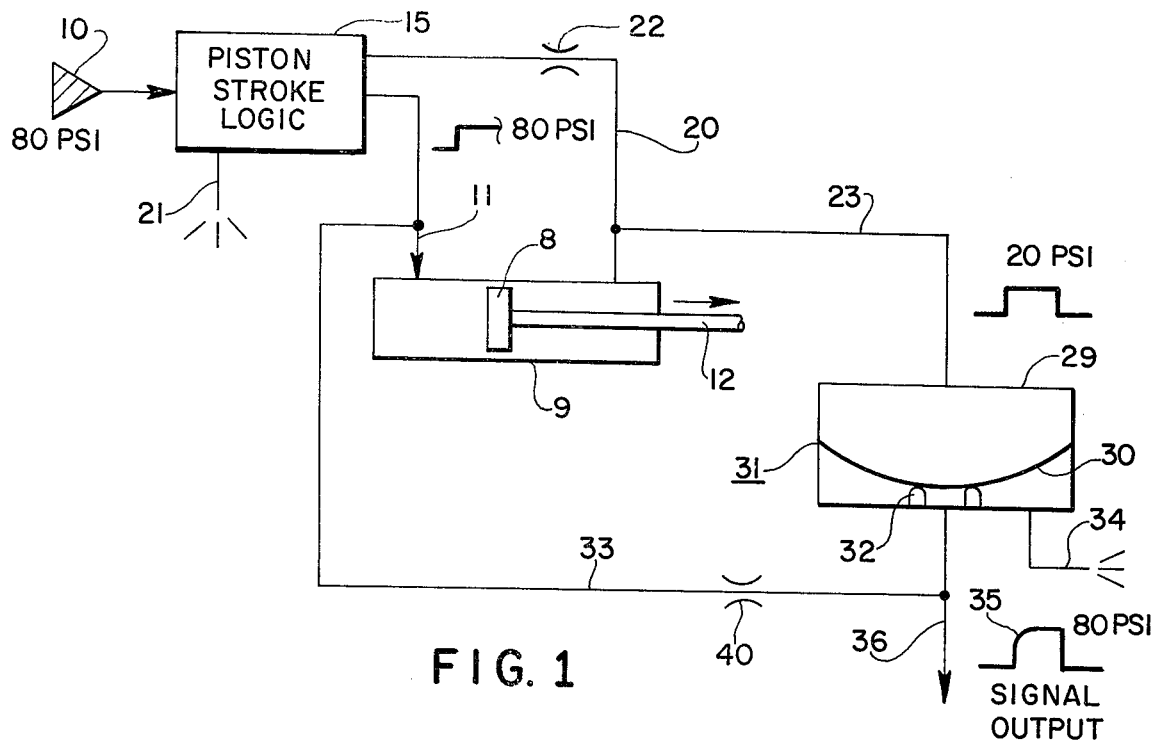
FIG. 1
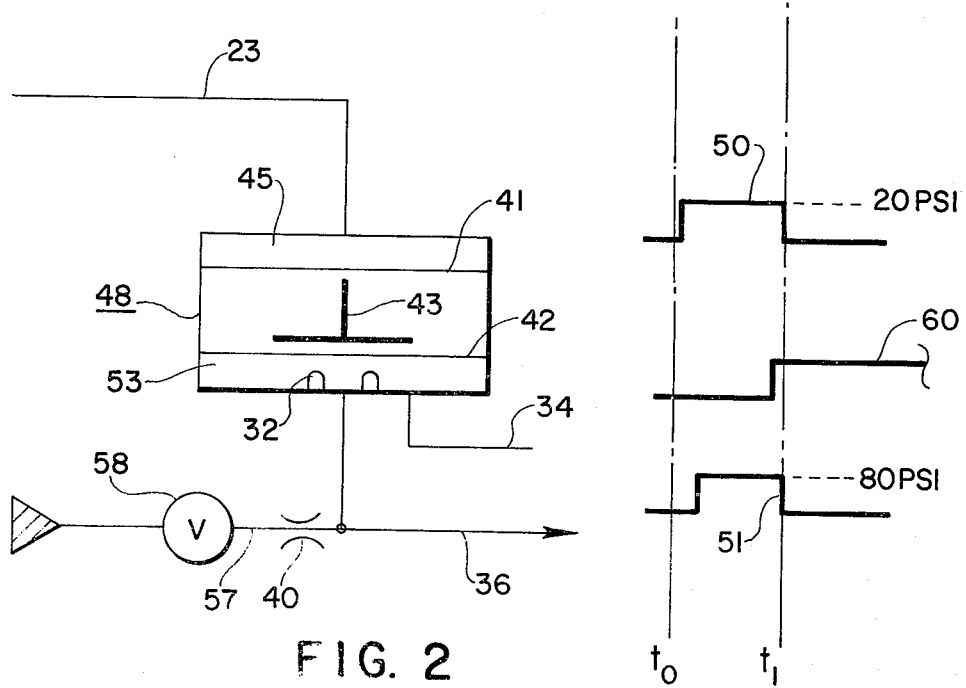
FIG. 2
FIG. 3

CYLINDER MOTION SENSING

This invention relates to fluid logic circuits and more particularly it relates to such circuits operable in conjunction with fluid operated piston drive means to detect malfunctions during a piston stroke.

STATE OF ART AND PROBLEM AREAS

There are many occasions to require a signal at the precise moment a piston has finished a power stroke. For example, it may be desirable to initiate a reciprocating stroke as soon as possible, or to start further asynchronous operations in a logic sequence as soon as a stroke is completed. Also it is desirable to indicate any malfunction such as jamming or overloading of a piston which causes it to slow down abnormally during a stroke.

Mechanical devices for sensing the piston position are slow in operation and require delicate adjustments to keep in proper position and timing. If electrical contacts are used to sense the position, it is necessary to go through a conversion phase to fluid operation which is undesirable. Also position sensing at the end of a completed stroke is not commensurate with a signal provided during the entire power stroke movement period. Thus, for example the detection of a prematurely finished stroke due to jamming may not be sensed by a limit switch. Accordingly, the provision of a fluid operable sensing logic circuit providing a dynamic signal during movement of the piston is desirable.

However several problems exist is providing acceptable fluid sensing techniques. They should be available for sensing piston motion in both directions in bidirectional power strokes are used. Also the sensing circuits must be sensitive without interference with the normal operational circuits or fluid flow paths used to operate the piston, nor should they impose a considerable load upon the system. The ability to set a threshold of the rate of piston travel is also necessary to indicate overloads which do not stop piston travel. Also a detector should be capable of giving a signal for incorporation in systems operable with dynamic negative going transition type signals.

OBJECTS OF THE INVENTION

It is therefore a general object of the invention to provide fluid operated means for designating abnormal operation of a movable piston.

Another general object of the invention is to provide fluid logic apparatus correcting the foregoing deficiencies.

Another object of the invention is to provide fluid logic piston rate of movement detection apparatus.

A more specific object of the invention is to provide sensitive fluid operable detection means which does not significantly load the system and which provides a negative going transition fluid logic output signal.

BRIEF DESCRIPTION

Therefore in accordance with this invention, the back-pressure of the exhaust air forced out of the cylinder during a piston power stroke is sensed by a fluid logic element. A threshold device is used to sense the threshold pressure value at a predetermined rate of piston travel. The logic element is of the type having an impervious elastomer diaphragm moved in response to pressure to control fluid flow signal paths. By use of negative dynamic pressure transitions, amplification is provided so that a lower pressure exhaust signal may be used to control a higher signal pressure that is commonly used throughout a fluid logic system. Back-pressure is increased by use of a restriction in the exhaust flow path.

THE DRAWING

The foregoing and other features, advantages and objectives are set forth in the following more detailed description of the invention which refers to the accompanying schematic diagram of the fluid operated piston motion sensing apparatus afforded by this invention, wherein:

FIG. 1 shows a schematic fluid circuit diagram of one embodiment of the invention, FIG. 2 shows a further fluid logic sensor element configuration of the invention, and FIG. 3 is a waveform graph illustrating operating conditions, of the embodiment of FIG. 2 related to at time scale $t_0$, $t_1$, etc.

DETAILED DESCRIPTION

As may be seen from FIG. 1 of the drawing, a piston 8 is moved within cylinder 9 by means of fluid pressure from source 10 applied to lead or pipe 11 to push the piston 8 toward the arrow 12. Although a single acting system is shown, where it may be assumed that the piston 8 has a return stroke controlled by a spring (not shown), the principles of this invention are consistent for employment if the piston is both extended and retracted by fluid action.

Control of fluid to operate the cylinder in a conventional way is shown by block 15, which includes appropriate timing and fluid control logic circuits to direct fluid under pressure from source 10 into pipe 11 when it is desired to move piston 8 to the right as shown in the drawing, and to reverse the fluid in the case of double acting systems. Typically a high pressure level of 80 psi is used in this action as well as in logic control circuits of the type which may be used in block 15. Such circuits are disclosed for example in the co-pending application of this assignee Ser. No. 349,451 filed Apr. 9, 1973, now U.S. Pat. No. 3,812,881 for Fluid Responsive Control Valves. The logic switching elements 31 are well known and comprise generally cylindrical cavities in a housing on either side of diaphragm 30.

Whenever piston 8 moves to the right as shown by arrow 12, there is an exhaust of gas from within cylinder 9 forced out lead or pipe 20. Typically as shown by lead 21 out of block 15 this may be exhausted to the atmosphere. However when this is done the pressure level within pipe 20 may be low particularly if the piston moves slowly. Thus, a restriction 22 is provided to keep the pressure within pipe 20 at the junction with flow channel 23 higher than atmospheric when the piston 8 is pushing fluid out of pipe 20 in response to movement of the piston to the right.

Accordingly, if the piston 8 moves normally in response to pressure of source 10 in pipe 11, enough pressure exists in pipe 23 to operate diaphragm 30 in the logic switch unit 31 and close it against the seat 32, to thereby prevent flow of fluid under pressure from source 10 through channel 33 out the outlet pipe 34 into the atmosphere. Thus, the higher pressure signal level 35 will be produced in the output waveform at terminal 36 when the diaphragm 30 is deflected into seat 32 by exhaust pressure from a normally moving piston in response to pressure at lead 11. Whenever the piston stops or slows down sufficiently, the pressure decreases at diaphragm 30 and permits vent 34 to open so that the output signal pressure level of waveform 35 falls to near zero because of restriction 40.

Because of restriction resistor 22, the back pressure of cylinder 9 at lead 23 will cause diaphragm 30 to close seat 32. Then the back pressure is exerted on the entire surface of diaphragm 30, whereas the greater pressure of source 10 applied at seat 32 is restricted to a small area exerted on the opposite surface of diaphragm 30. Accordingly the diaphragm will remain seated when the dimensions of pressure and area on the upper surface exceed those on the lower surface within seat 32. Therefore the signal waveform 35 will rise to substantially the 80 psi pressure of source 10. However when the back-pressure from cylinder 9 at pipe 23 falls below the threshold required to keep seat 32 closed, as may be encountered at the end of the stroke of piston 8 or upon encountering a heavy load, seat 32 will open and vent 34 will cause the trailing edge of waveform 35 to fall to near atmospheric pressure because of the action of resistor 40.

The trailing edge appears at the end of the stroke of piston 8 and thus the negative transition signal may be used at the trailing edge of waveform 35 to operate logic circuit 15 and return piston 8 in the opposite direction in a double acting piston embodiment, or to start further operations in a system which should await the full stroke of piston 8. Also the duration of waveform 35 in this embodiment indicates the period of movement of the piston and this may be used for other controls or may be timed to see whether the stroke is finished in normal time.

If the logic circuit 15 reverses the double acting piston embodiment and provides high pressure at lead 20, conversely exhausting lead 11, then the logic switching element 31 has diaphragm 30 seated against seat 32 but the pressure at 36 is low so that there is no signal. A similar element coupled to lead 11 can sense the exhaust from the return stroke if desired.

Thus the exhaust pressure from a moving cylinder is sensed to determine when the motion of piston 8 stops or slows below a chosen threshold value because of binding, etc. Also the fact that no initial movement takes place may be detected in this embodiment. For example, should piston 8 not move in response to the pressure waveform at lead 11, no exhaust pressure from piston 8 will be established at lead 23. Diaphragm 30 under these conditions will not seal seat 32 and vent 34 will remain open so waveform 35 does not occur. Therefore the presence of a cylinder drive pressure without any corresponding signal output waveform 35 at the start of the cycle is an indication of jamming or lack of movement of cylinder 8 at enough speed to produce a pressure at 23 above the necessary threshold value.

Detection of the falling edge of the waveform 35 may be accomplished with known detectors to start other sequential operations in a system as soon as a full power stroke is completed, or the full output waveform may be used where the time period of movement for piston 8 is desired.

As may be seen in FIG. 2 a modified logic element embodiment 48 is shown. In FIG. 2 similar reference characters refer to like elements shown in FIG. 1. This modified element 48 includes a control member 43 of the type well known in the art. The logic element 48 comprises two diaphragms 41, 42 between which a control member 43 is held to move toward and away from valve seat 32. The control member 43 has a different area at opposite ends contacting the respective diaphragms 41, 42 as represented by the schematically shown T configuration.

The 80 psi at lead 36 within valve seat 32 is not initially attained because of high pressure released for piston drive by valve 58 (diagrammatically showing the part of the piston stroke logic device 15 of FIG. 1) and restriction 40 until after $t_o$ when the lower pressure at lead 23 closes valve seat 32, squeezing diaphragm 42 thereagainst by control member 43 pressure. The respective end areas are designed so that the area of diaphragm 41 within compartment 45 upon which the peak exhaust pressure as illustrated at waveform 50 of FIG. 3 of the order of 20 psi or less is acting will hold the control member at seat 32 closed even when the 80 psi level is attained at lead 36.

The waveforms of FIG. 3 correspond to those pressure conditions found in the FIG. 2 embodiment. Thus, waveform 50 illustrates conditions of the cylinder exhaust as seen at lead 23, waveform 60 illustrates the fluid flow at vent 34 and waveform 51 illustrates the waveform at output lead 36.

Once the exhaust pressure 50 falls below a threshold determined primarily by relative end areas of control member 43 and the effective diaphragm surfaces upon which the fluid pressures are exerted then the valve seat 32 opens to provide the negative transition 51. Even should the pressure at line 23 be reestablished the valve seat 32 remains open because of the combined greater area pressure relationship maintained by fluid flow through compartment 53 to vent 34 and the differential in pressures on the larger and smaller ends of control member 43. Thus, a threshold operating level may be designed within a wide range of values.

In this embodiment, it is noted that a new cycle cannot be established until the source of 80 psi fluid is temporarily disconnected from lead 36 while the exhaust pressure level (50) is established in compartment 45.

Should a continuous alarm signal be desired until the source fluid flow is disconnected at lead 33 by valve 58 therefore, the presence of fluid flow out lead 34 may be sensed with lead 36 closed. Thus fluid flows as shown by waveform 60.

It is seen therefore that this invention provides means for sensing the motion and speed of a cylinder as well as the end of the stroke, rather than just a static position at one end of a cycle as with a limit switch, and that thus the output signals of this device may be used for various control functions in a fluid operated logic system not possible with prior art mechanical or electrical sensors of a static condition or position.

Having therefore described a preferred embodiment of the invention, the appended claims define with particularity those novel features believed descriptive of the spirit and scope of the invention.

What is claimed is:

1. Apparatus for sensing the motion of a fluid operated piston within a cylinder, comprising in combination, a source of fluid under pressure, means gating said fluid to produce movement of said piston within said cylinder, a flow channel conveying exhaust fluid forced from the cylinder by movement of said piston, a fluid logic switching element having two fluid reception chambers and being responsive to pressure differential between two fluid pressures at said two chambers to switch a member from one condition to another, flow channel means coupling one said chamber to said source, means coupling the other said chamber to said flow channel conveying exhaust fluid, and means including said member in said switching element responsive to the differential pressure between said exhaust fluid and said source of fluid to switch said member, and output fluid flow path means coupled to said source and responsive to switching of said member to produce thereby at an output lead a fluid output signal in response to exhaust fluid exceeding a predetermined pressure magnitude indicating that the piston is moving at a predetermined rate within said cylinder thereby causing said exhaust fluid to exceed said pressure magnitude.

2. Apparatus as defined in claim 1 wherein said fluid logic element is a device with said member comprising a flexible impervious elastomeric diaphragm coupled for flexing in response to said exhaust fluid pressure and said means to produce a fluid signal includes a valve operated by said diaphragm to control fluid flow at a source pressure substantially greater than the pressure of fluid from said exhaust.

3. Apparatus as defined in claim 1 wherein said logic element has said member comprising structure with two diaphragms separated by a movable control member with different areas in contact with the respective diaphragms.

4. Apparatus as defined in claim 1 including means restricting said flow channel conveying exhaust fluid at a position to increase to the pressure in said other chamber with the piston is moving to exhaust the fluid.

5. Apparatus as defined in claim 2 wherein said fluid logic element has a fluid flow path from said source with a valve therein controlled by said diaphragm member to provide said fluid output signal at said pressure of the source of fluid during the period the exhaust fluid exceeds a predetermined threshold pressure.

6. Apparatus as defined in claim 2 including restrictor delay means coupled in said flow channel means between said source and said one said chamber for delaying the initial flow of source pressure to reach said diaphragm thereby effectively applying said exhaust fluid pressure to said diaphragm before applying said fluid flow of said source at said greater pressure to said valve.

7. Apparatus as defined in claim 3 wherein said logic element has a valve seat controlled by said control member receiving a high pressure fluid and the different areas of the control member are selected to permit a low pressure exhaust pressure to switch said element by closing said valve seat.

8. Apparatus as defined in claim 7 wherein the pressures on the different end areas of said control member are established to cause said high pressure fluid to keep said valve seat open after said exhaust fluid falls below a predetermined pressure.

* * * * *